April 20, 1943. Y. STERN 2,317,310
FILM AND SLIDE PROJECTING APPARATUS
Filed April 30, 1941 2 Sheets-Sheet 1
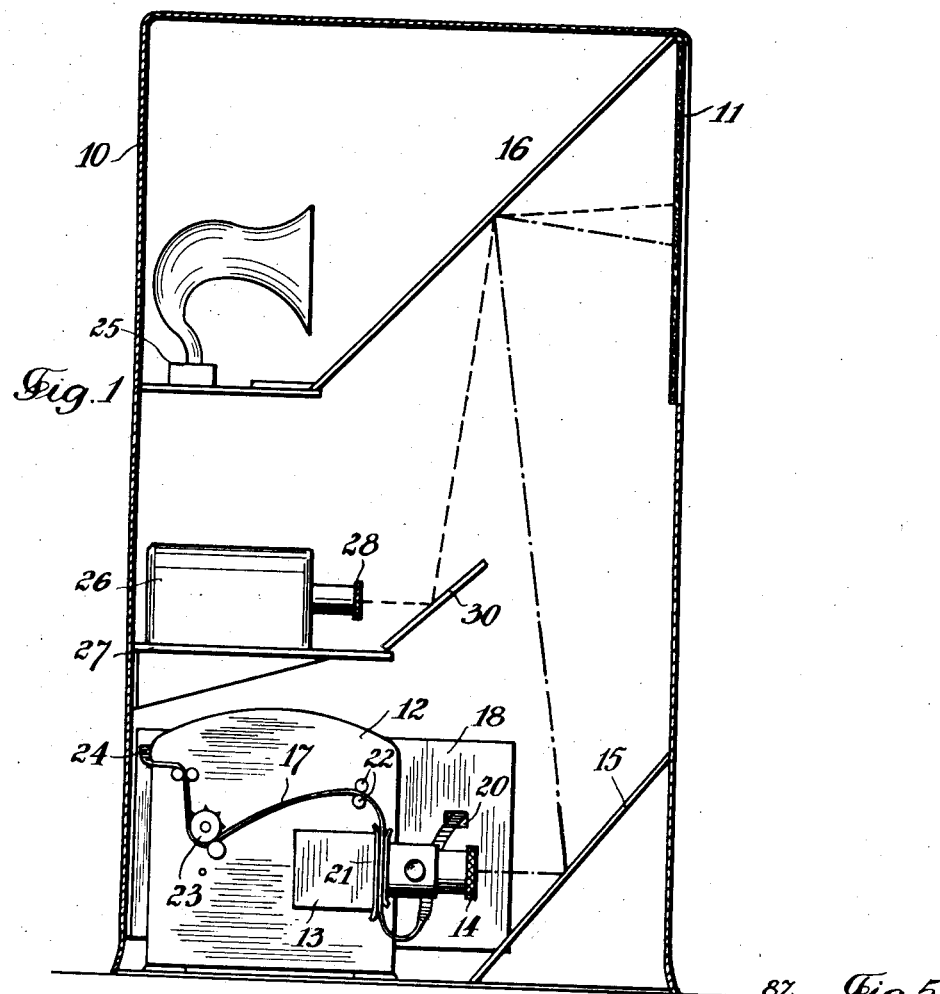
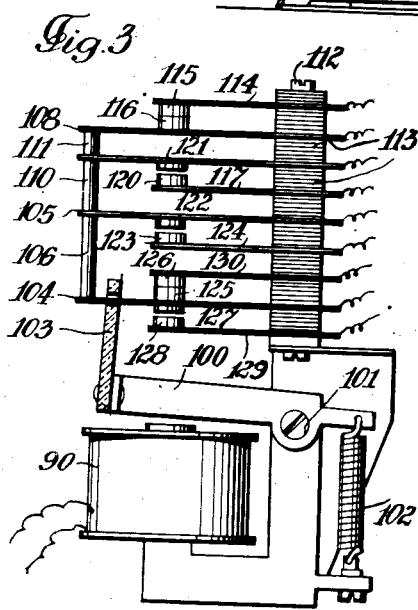
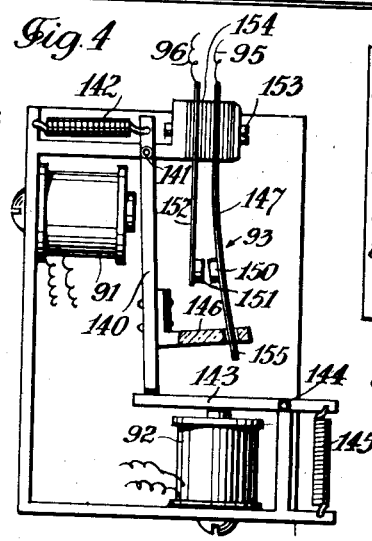
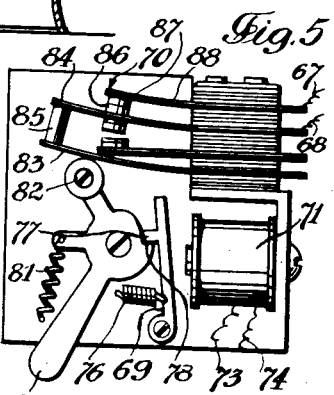
INVENTOR:
Yermie Stern
BY
ATTORNEY

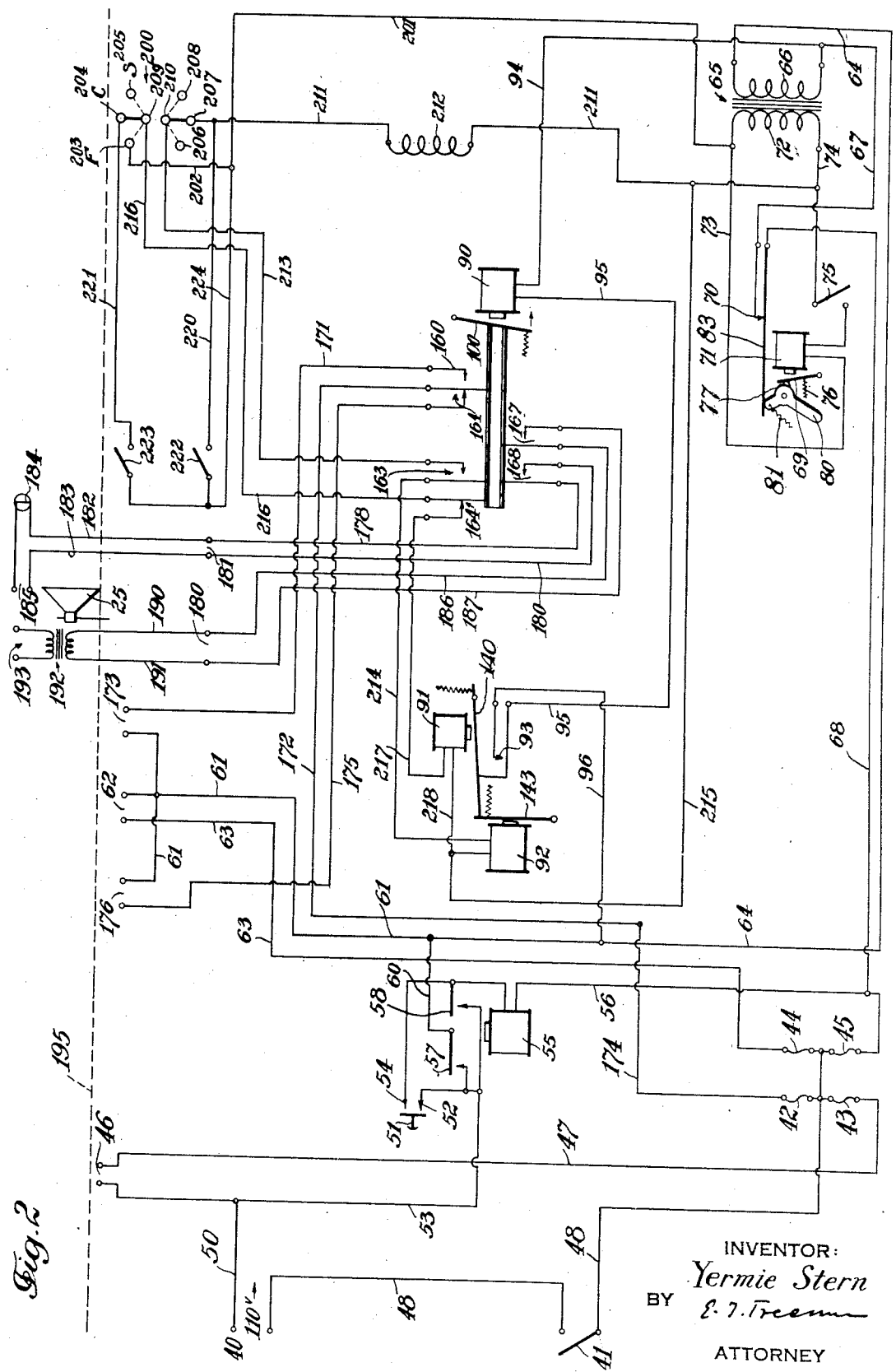

Patented Apr. 20, 1943

2,317,310

UNITED STATES PATENT OFFICE 2,317,310

FILM AND SLIDE PROJECTING APPARATUS

Yermie Stern, New York, N. Y., assignor, by mesne assignments, to Gertrude Israel, New York, N. Y.

Application April 30, 1941, Serial No. 391,074

7 Claims. (Cl. 88—16.2)

This invention relates to an apparatus for successively projecting a motion picture film and a predetermined number of still pictures or slides onto the same screen. More particularly the invention comprises an electric circuit for selectively operating either a means for projecting a motion picture film or a slide projecting apparatus or for successively operating in predetermined sequence the motion picture film projecting means and the slide projector.

In accordance with the invention I provide a housing which houses a motion picture projector and associated mechanism and a slide projector which is adapted to project a plurality of slides or any kind of still pictures. The motion picture film as well as the slides are projected onto the same screen forming a portion of the wall of the housing. Preferably, the motion picture film has a sound track and a sound reproducing mechanism so that sound films may be reproduced. Also the slide projector may be associated with a suitable sound reproducing means such as sound tape to accompany the showing of the slides with a corresponding explanation. Instead of the sound tape a film having a sound track may be used or any other reproducing means, for instance phonograph records.

The film projector as well as the slide projector and their associated sound reproducing means are controlled by an electric circuit. The electric circuit is so arranged that either films or slides only may be reproduced. Moreover, the electric circuit also permits to successively show a film, thereafter a predetermined number of slides, and then another film and so forth. Means are provided to disconnect the film projector and its associated mechanisms when the film breaks. The electric circuit may also include a counter for counting the number of films that have been played.

It is accordingly an object of the invention to provide in combination a film projector and a slide projector which will operate either singly or successively one after the other.

Another object of the invention is to automatically reproduce a film together with the accompanying sound and a number of slides also with accompanying sound, and means for automatically changing from film reproduction to slide reproduction and vice versa.

Still an object of the invention is to provide an electric circuit that permits to selectively operate the apparatus of the invention to either show a motion picture film only or slides only or both, motion picture film and slides in predetermined succession.

Still another object of the invention is to provide a film break switch that will automatically disconnect the film projector and the film sound reproducing means when the film breaks.

These and further objects of the invention will become more apparent in the following description of a preferred embodiment of the invention illustrated in the drawings, wherein:

Fig. 1 is a vertical section of an apparatus in accordance with the invention.

Fig. 2 is an electric circuit diagram employed for controlling the apparatus of my invention.

Figs. 3, 4 and 5 are detail views of various relays shown diagrammatically in the electric circuit of Fig. 2.

Referring to the drawings and more particularly to Fig. 1, the apparatus of the invention comprises a housing 10 having a screen 11 forming a part of the front wall thereof. Housing 10 comprises a motion picture film reproducing apparatus generally indicated at 12. Apparatus 12 includes a film projector 13 that projects light through lens 14 onto mirror 15 arranged opposite lens 14. The light from film projector 13 is reflected by mirror 15 onto mirror 16 provided in the upper portion of housing 10. Mirror 16 projects the light onto screen 11 where an enlarged picture of film 17 is produced. Film 17 is preferably wound on a film reel arranged in box 18, the film reel using an endless band of film. A film reel of the type which may be used in the apparatus of the invention is disclosed in co-pending application of Alfred Gruenhut, Automatic rewind film carrier, Ser. No. 381,975, filed on March 6, 1941, and assigned to the same assignee.

The film leaves box 18 through aperture 20 and moves through film gate 21 wherefrom it passes through rollers 22 feeding the film onto film sprocket 23. Film sprocket 23 is driven in any suitable manner and feeds the film onto the film reel through aperture 24 in box 18.

It will be understood that the film is fed through film gate 21 with an intermittent movement as is well known to those skilled in the art. Box 18 also includes an exciter lamp, a photoelectric cell and an amplifier. The photoelectric cell receives its light through the sound track on the film. The electric impulses produced by the photoelectric cell are amplified by the amplifier and fed to a loud-speaker schematically indicated at 25, Slide projector 26 is secured on bracket 27 projecting from housing 10. Slide projector 26 projects the light through lens 28 onto mirror 30 fastened on bracket 27. Mirror 30 projects the light onto mirror 16 wherefrom it impinges on screen 11. A practical embodiment of housing 10 will be much longer than the one shown in Fig. 1. Therefore the angle between the light rays reflected by mirrors 15 and 30, respectively, will be much smaller than the one shown in Fig. 1, and accordingly, both pictures reflected by mirrors 15 and 30 will be projected onto approximately the same place on screen 11. Slide projector 26 includes an apparatus for automatically and successively projecting a predetermined number of slides or still pictures. Slide projectors of this type are readily available on the market. The slides, for instance, may be arranged in a rotatable cylinder which advances the slides one at a time to a position adjacent the light source. Now, the slide is laterally moved into the projector to be projected and thereafter the slide returns into the cylinder which rotates the next slide to a position adjacent the light source. Since neither film projector 13 nor slide projector 26 form part of this invention, they have not been described in detail here.

The electric circuit for selectively energizing either the film projector and its associated mechanism or the slide projector is shown in Fig. 2. The wiring diagram comprises a current source 40 which is connected by way of main switch 41 with four fuses 42, 43, 44 and 45. Fuse 42 protects the two projectors, the film projector and the slide projector. Fuse 43 is in circuit with current outlet 46 which is directly connected with one pole of current source 40 by way of wire 47. Fuse 44 is in circuit with the amplifier for the sound translating mechanism, and fuse 45 protects the transformer. When main switch 41 is closed it connects outlet 46 by way of wire 48, fuse 43, wire 47 with wire 50 connected with the other pole of current source 40. A fan for cooling the film projector may be plugged into current outlet 46.

In order to supply current to the various relays and the electric apparatus controlled thereby push button 51 is provided. Push button 51 has a contact 52 connected with wire 53 which, by way of wire 50, is connected with one pole of current source 40. The other contact 54 of push button 51 is in line with relay 55 connected with transformer fuse 45 by lead 56. Hence it will be seen that when push button 51 is pushed in, it closes the circuit of relay 55 by way of leads 50, 53, contacts 52, 54, leads 56, transformer fuse 45 and lead 48, provided main switch 41 is closed. When relay 55 is energized, it attracts two contacts 57 and 58. When contact 58 is closed it directly connects relay 55 with lead 53. Accordingly, once push button 51 is actuated, relay 55 will remain energized as long as main switch 41 is closed.

Contact 57 connects lead 53 with wire 60 branching off into wire 61. Wire 61 feeds the current to socket 62. Socket 62 is connected with the amplifier for amplifying the impulses of the photoelectric cell controlled by the sound on the sound track. The other pole of socket 62 is connected with wire 63 which connects it with amplifier fuse 44 which in turn closes the electric circuit through conductor 48. Hence, it will be seen that the electric circuit of amplifier socket 62 is always closed as soon as push button 51 is actuated. The amplifier for the sound translating mechanism should always be alive because it needs some time to heat up before it will operate satisfactorily.

Wire 60 is also connected with conductor 64 feeding the primary 66 of transformer 65. The other pole of the transformer primary 66 is connected with leads 67 and 68 between which film break switch 70 is arranged. Wire 68 is connected with transformer fuse 45 connected by way of lead 48 with one pole of current source 40. Hence, it will be seen that as long as main switch 41 is closed and push botton 51 actuated, transformer primary 66 will be connected with the current source. Film break switch 70 is actuated by relay 71 and is normally closed. Film break switch 70 is opened when relay 71 is energized which occurs upon breakage of the film. Relay 71 is connected with the two poles of secondary 72 of transformer 65 by leads 73 and 74. Film break switch 75 is arranged in lead 74 of relay 71. In a preferred embodiment film break switch 75 consists of a roller that rolls over the film. When the film breaks, the roller is no longer supported by the film and falls down thus closing the electric circuit that includes relay 71 and transformer secondary 72. Now, relay 71 will be energized and opens switch 70.

The film break relay 71 and its operating mechanism is shown in greater detail in Fig. 5. Plate 69 is normally urged by spring 76 away from relay 71. Plate 69 has a projection 77 which engages with nose 78 on lever 80. Spring 81 secured to lever 80 tends to rotate lever 80 in a counterclockwise direction. Lever 80 has a roller 82 pressing against flexible metal strip 83. Strip 83 is connected with a similar flexible strip 84 by means of an insulating spacer 85. Flexible strip 84 bears a contact 86 adapted to cooperate with contact 87 on flexible metal tape 88. Contacts 86 and 87 together form switch 70, schematically shown in Fig. 2. Metal strips 84 and 88 are connected with leads 68 and 67, respectively.

The operation of the film break relay 71 will now be described. When relay 71 is energized, it attracts plate 69 against the action of its spring 76. Hence projection 77 on plate 69 disengages nose 78 of lever 80 which is now free to rotate in a counterclockwise direction under the influence of its spring 81. The rotary movement of lever 80 disengages its roller 82 from flexible strip 83. Hence, strip 84 is free to return to its normal position and contacts 86 and 87 disengage. In order to return the parts into their position of Fig. 5 lever 80 must be rotated by hand in a clockwise direction until its nose 78 engages with projection 77 of plate 69. Thus it will be seen that when relay 71 is energized it opens switch 70. Switch 70 can only be closed again by rotating lever 80 by hand. This is done after the broken film has been repaired.

The electric circuit of Fig. 2 includes a constant duty relay 90 and two interlocking relays 91 and 92 which actuate a switch 93 that controls the current supply of constant duty relay 90. Lead 94 connects relay 90 with one pole of transformer primary 66. Lead 95 connects constant duty relay 90 with switch 93 operated by interlocking relay 91 and 92. Conductor 96 connects switch 93 with conductor 64 thus closing the electric circuit.

Constant duty relay 90 and the contacts operated thereby are shown in Fig. 3. However, since Fig. 3 is a side view of relay 90 only one set of contacts has been illustrated. Plate 100 pivoted at 101 is arranged to be attracted by relay 90. Spring 102 secured to the free end of plate 100 tends to keep plate 100 away from relay 90. Insulating member 103 is secured to plate 100 and actuates flexible metal strip 104 spaced from metal strip 105 by insulating spacer 106. Two further metal strips 107 and 108 are spaced from each other by spacers 110 and 111. The ends of metal strips 104, 105, 107 and 108 are secured together in spaced relationship by screw 112. The metal strips are spaced by insulating members generally indicated at 113. Flexible metal strip 114 bears a contact 115 cooperating with contact 116 on metal strip 108. Flexible metal strip 117 bears contact 120 which is normally spaced from contact 121 on strip 117. Contact 122 on flexible strip 105 is normally spaced from contact 123 on flexible metal strip 124. Flexible strip 104 has two contacts 125 and 127. Contact 125 normally makes contact with contact member 126 on flexible metal strip 130. On the other hand contact 127 on strip 104 is normally spaced from contact 128 on flexible member 129.

Hence, it will be seen that when relay 90 is not energized, contacts 115, 116 and contacts 126, 125 are normally closed. The other contacts 120, 121, 122, 123 and 127, 128 are normally open. When relay 90 is energized, it attracts plate 100 which in turn pulls down flexible strips 104, 105, 107 and 108. Thus it will be readily seen that all the contacts that are normally open will now be closed, while the contacts that are normally closed are opened. It is to be understood that constant duty relay 90 has a second series of contacts which are exactly symmetrical to the contacts shown in Fig. 3 as indicated schematically in Fig. 2.

Interlocking relays 91, 92 and switch 93 operated thereby are shown in Fig. 4. Plate 140 pivoted at 141 is arranged to be attracted by make relay 91. One end of plate 140 has a spring 142 which tends to rotate plate 140 in a counterclockwise direction and away from make relay 91. Plate 143 rotates about pivot 144 and is arranged to be attracted by break relay 92. Spring 145 tends to rotate plate 143 in a clockwise direction and away from its relay 92. The ends of plates 140 and 143 are arranged to lock each other as will be more fully explained hereinafter.

Insulating member 146 is secured to plate 140. Flexible metal strip 147 bears a contact 150 adapted to cooperate with contact 151 on flexible metal strip 152. Metal strips 147 and 152 are secured in spaced relationship by screws 153 and insulated from each other by insulating member 154. Metal strip 147 projects through a slot 155 in insulating member 146.

In the position of Fig. 4 break relay 92 has just been energized and has attracted its plate 143. Plate 140 now locks plate 143 and prevents it from rotating in a clockwise direction. On the other hand plate 140 is free to be rotated in counterclockwise direction by its spring 142 so that insulating member 146 bends metal strip 147 in a direction to space contacts 150 and 151. Hence it will be seen that switch 93 formed by contacts 150 and 151 is opened.

When make relay 91 is energized, plate 140 is attracted and will rotate in a clockwise direction. Simultaneously its end portion disengages plate 143 which is now free to rotate in a clockwise direction under the influence of spring 145. Now plate 143 will lock plate 140 and prevent it from rotating in a counterclockwise direction. Metal strip 147 is no longer bent, and hence contacts 150 and 151 close switch 93. It will be seen that interlocking relays 91 and 92, respectively, need only be energized for a short time and when one of the relays has been energized once, plates 140 and 143 will interlock each other so that switch 93 remains in its position.

As explained previously in connection with Fig. 2 constant duty relay 90 is controlled by switch 93. Normally, relay 90 is in its inoperative or "slide" position. However, when switch 93 is closed, constant duty relay 90 is energized and attracts plate 100. This is the "film" position.

Referring again to the electric circuit of Fig. 2 constant duty relay 90 is shown here in its inoperative or "slide" position. Relay 90 actuates a number of switches schematically indicated at 160, 161, 163, 164, 167 and 168. For the sake of clarity switches 160, 161, 163, 164, 167 and 168 have been given reference numerals which differ from the reference numerals for the contacts of Fig. 3. Switch 160 is normally open and is connected with leads 171 and 172. Lead 171 connects switch 160 with current outlet or socket 173. Film projector 13 is adapted to be connected with socket 173. Conductor 172 connects switch 160 with conductor 174 which in turn is connected with projector fuse 42. The other pole of film projector socket 173 is connected with conductor 61 which connects it with the other pole of current source 40. Hence, it will be seen that when switch 160 is closed, it energizes the film projector because the current will flow from current source 40 over conductor 48, main switch 41, projector fuse 42, conductors 174, 172 to switch 160 and hence to film projector socket 173.

Switch 161 is normally closed and opens when switch 160 closes. Conductor 172 is common to switches 160 and 161. The other contact of switch 161 is connected by conductor 175 with current outlet 176 to which the slide projector is connected. The other pole of slide socket 176 is connected with conductor 61, and hence it will be seen that the slide projector is energized when switch 161 is closed.

Switch 168 is connected with two conductors 178 and 180 which connect the switch with current outlet or socket 181. Current outlet 181 in turn is connected with two conductors 182 and 183 which are in line with exciter lamp 184 and a suitable current source 185. Hence it will be seen that when switch 168 is closed, current source 185 energizes exciter lamp 184, which occurs when constant duty relay 90 is energized.

Switch 167 is connected with two wires 186 and 187 which connect it with current outlet 188. Current outlet 188 in turn is connected with two wires 190 and 191 which are in line with the secondary of transformer 192 which is fed by current source 193. Transformer 192 operates loud-speaker 25. Hence, when switch 167 is closed, the circuit of loud-speaker 25 is energized. Loud-speaker 25 reproduces the sound on the sound track of the film. Exciter lamp 184 projects its light through the sound track on the film onto a photoelectric cell. The impulses of the photoelectric cell amplified by an amplifier connected with socket 62 are fed to loud-speaker 25. Dotted line 195 indicates that relays 90, 91, 92 as well as sockets 176, 62, 173, 188 and 181 are housed in a box while exciter lamp 184 and loud-speaker 25 with its transformer 192 are located elsewhere.

It will now be seen that in the position of Fig. 2 slide projector socket 176 only is energized. On the other hand, when relay 90 is energized, it moves contacts 160 to 170 into their "film" position. Now, film projector socket 173 is energized as well as exciter lamp 184 and loud-speaker 25. The energizing of constant duty relay 90 is controlled by switch 93 which in turn is actuated by make relay 91 and break relay 92. Relays 91 and 92 are controlled by switches 163 and 164 which are in electric circuit with double-pole three-way switch 200.

Double-pole three-way switch 200 has three different positions indicated F, C and S in Fig. 2. One pole of secondary 72 of transformer 65 is connected with lead 201 which is connected with contacts 203 and 206 of switch 200 through conductor 202. When switch 200 is in the F-position it connects contacts 203, 209 and contacts 208, 210. In the C-position contacts 204, 209 and contacts 207, 210 are connected, and in the S-position contacts 205, 209 and contacts 206, 210 are connected. The other pole of transformer secondary 72 is connected through lead 211 with switch contact 207. Counter 212 is arranged in lead 211 and serves to count the number of films which have been played. Contact 210 of switch 200 is connected by lead 213 with switch 163.

The other pole of switch 163 has a conductor 214 connecting it with break relay 92. Conductor 215 connects the other pole of break relay 92 with one of the poles of transformer secondary 72. Contact 209 of switch 200 is connected with switch 164 by conductor 216. The other pole of switch 164 is connected with make relay 91 by wire 217. Wire 218 connects the other pole of make relay 91 with conductor 215. Contacts 204 and 207 corresponding to the C-position of switch 200 are connected by conductors 220 and 221 having interposed therebetween film switch 222 and slide switch 223. Besides, film switch 222 is connected with conductor 201 by wire 224.

Film switch 222 is closed for a short moment when one film has been played. Preferably, the edge of the film is provided with a suitable notch which engages with the film switch to effect closing thereof. After the notch on the film has passed switch 222 is opened again. Similarly, slide switch 223 is closed for a short moment when a predetermined number of slides has been shown. To this end the rotary casing of the slide projector may have a projecting member that closes slide switch 223 arranged to engage the projection. When the projection passes the slide switch, it opens again.

Double-pole three-way switch 200 serves to adjust at will the electric circuit so that film only, slides only, or film and slides in succession may be played. In order to show films only, switch 200 is put into the position designated with F. Now, contacts 203, 209 and contacts 208, 210 are connected. Contact 208 is not connected with any other part of the circuit.

However, contact 203 is connected with transformer secondary 72 by wires 201 and 202 which are now in line with conductor 216 connected with contact 209. Conductor 216 is connected by switch 164 and conductor 217 with make relay 91. The circuit of make relay 91 is closed through wire 215 to the other pole of transformer secondary 72. Accordingly, if relay 90 is in the position of Fig. 2, make relay 91 will be energized which causes closing of switch 93 as explained hereinabove. Now, constant duty relay 90 is energized as previously explained. This will bring contacts 160, 161, 163, 164, 167 and 168 into their film position and hence film projector socket 173, exciter lamp 184 and loud-speaker 25 are now energized. The various films in box 18 can now be shown successively.

Each time one film has been played, film switch 222 is closed in the manner previously explained. This closes an electric circuit from transformer secondary 72 through counter 212, wires 211, 220, film switch 222, wires 224, 201 and back to transformer secondary 72. Hence, it will be seen that counter 212 is energized each time film switch 222 closes, viz. each time one film has been completely shown.

Supposing now it is desired to show slides only. Double-pole three-way switch 200 is put in the S-position, and hence contacts 205, 209 and contacts 206, 210 are connected. Contact 205 is not connected with any part of the electric circuit and hence wire 216 is not alive now. Contact 206, however, is connected through wires 202, 201 with the one pole of transformer secondary 72. Contact 206 is now connected with contact 210 which in turn is connected with switch 163 by wire 213.

When relay 90 and contacts 160 to 170 controlled thereby, are in the position of Fig. 2, nothing happens because switch 163 is open. However, when constant duty relay 91 was previously energized, switch 163 will now be closed. Accordingly, break relay 92 is connected by wire 214 with switch 163 and by wire 215 with the other pole of transformer secondary 72. Accordingly, break relay 92 is energized and opens contact 93 which in turn causes de-energization of relay 90. Hence, contacts 160 to 170 return to their normal or "slide" position. In this case slide projector socket 176 is energized.

With the electric circuit shown in Fig. 2 it is also possible to show in succession a motion picture film and thereafter a predetermined number of slides. For this purpose it is only necessary to put double-pole three-way switch 200 into the position designated with C. Now contacts 204, 209 and contacts 207, 210 are connected. Contact 207 is connected with one pole of transformer secondary 72 by wire 211 through counter 212. Contact 207 is connected with contact 210 which in turn is connected with switch 163 through wire 213. Switch 163 is normally open, i. e. when constant duty relay 90 is not energized.

Contact 204 of switch 200 is connected with one pole of transformer secondary 72 by wire 201, slide switch 223 and wire 221. Since contact 204 is connected with contact 209, transformer secondary 72 is connected with switch 164 through the intermediary of wire 216. Switch 164 is normally open and hence, connects make relay 91 through the intermediary of wire 217 with contact 209. The other pole of transformer secondary 72 is connected with make relay 91 through wire 215. It will now be seen that when slide switch 223 is closed, make relay 91 is energized. This causes closing of switch 93 which in turn energizes constant duty relay 90. Hence, when slide switch 223 closes, it will bring contacts 160, 161, 163, 164, 167 and 168 into their "film" position, and playing of the film begins.

However, now switch 164 is open while switch 163 is closed. Switch 163 is connected with one pole of transformer secondary 72 when film switch 222 is closed. Now, switch 163 is connected with break relay 92 which is now energized causing opening of switch 93. This in turn de-energizes relay 90. Hence, it will be seen that closing of film switch 222 and slide switch 223, respectively, causes opening and closing of the circuit of constant duty relay 90.

Various changes and modifications may be made to the details of construction of the invention without departing from the broader spirit and scope thereof, as set forth in the following claims.

I claim:

1. An electric circuit comprising a constant duty relay, a current source and a switch for controlling said constant duty relay, said switch being controlled by a make relay and a break relay, means for interlocking said make relay and said break relay, said constant duty relay controlling a plurality of switches, a number of said switches being normally open when said constant duty relay is not energized, the remainder of said switches being normally closed when said constant duty relay is not energized, a switch having three positions, one position for energizing said make relay, a second position for energizing said break relay, and a third position for selectively energizing said make relay and said break relay, a film switch and a slide switch in line with said switch in its third position, said film switch being arranged to be closed when a predetermined portion of the film has been played for energizing said break relay, said slide switch being arranged to be closed when a predetermined number of the slide pictures has been shown for energizing said make relay, said film switch and said slide switch being effective in the third position of said three-way switch for controlling said make relay and said break relay.

2. An electric circuit comprising a constant duty relay, a current source and a switch for controlling said constant duty relay, said switch being controlled by a make relay and a break relay having means for interlocking said two relays, said constant duty relay controlling a plurality of switches, a number of said switches being normally open when said constant duty relay is not energized, the remainder of said switches being normally closed when said constant duty relay is not energized, said normally open switches being in line with a current source and a film projector for projecting a motion picture film, an exciter lamp and a loud-speaker, said normally closed switches controlling a slide projector for projecting slide pictures and connected with a current source, a switch having three positions, one position for energizing said make relay, a second position for energizing said break relay, and a third position for selectively energizing said make relay and said break relay, a film switch and a slide switch in line with said switch in its third position, said film switch being arranged to be closed when a predetermined portion of the film has been played for energizing said break relay, said slide switch being arranged to be closed when a predetermined number of the slide pictures has been shown for energizing said make relay, said film switch and said slide switch being effective in the third position of said three-way switch for controlling said make relay and said break relay.

3. An electric circuit comprising a constant duty relay, a current source and a switch for controlling said constant duty relay, said switch being controlled by a make relay and a break relay having means for interlocking said relays, said constant duty relay controlling a plurality of switches, a number of said switches being normally open when said constant duty relay is not energized, the remainder of said switches being normally closed when said constant duty relay is not energized, said make relay being in line with a normally closed switch, said break relay being in line with a normally open switch, a three-way switch having three positions for selectively controlling the energizing of said make relay and of said break relay, a film switch and a slide switch in line with said switch in its third position, said film switch being arranged to be closed when a predetermined portion of the film has been played for energizing said break relay, said slide switch being arranged to be closed when a predetermined number of the slide pictures has been shown for energizing said make relay, said film switch and said slide switch being effective in the third position of said three-way switch for controlling said make relay and said break relay.

4. An electric circuit comprising a constant duty relay, a current source and a switch for controlling said constant duty relay, said switch being controlled by a make relay and a break relay having means for interlocking said relays, said constant duty relay controlling a plurality of switches, a number of said switches being normally open when said constant duty relay is not energized, the remainder of said switches being normally closed when said constant duty relay is not energized, said normally open switches being in line with a current source and a film projector for projecting a motion picture film, an exciter lamp and a loud-speaker, said normally closed switches controlling a slide projector for projecting slide pictures and connected with a current source, a switch having three positions, one position for energizing said make relay, a second position for energizing said break relay, and a third position for selectively and successively energizing said make relay and said break relay, a normally open film switch and a normally open slide switch in line with said switch in its third position, said film switch being arranged to be closed when a predetermined portion of the film has been played for energizing said break relay, said slide switch being arranged to be closed when a predetermined number of the slide pictures has been shown for energizing said make relay, said film switch and said slide switch being effective in the third position of said three-way switch for controlling said make relay and said break relay, and a counter in line with a current source and said normally open film switch, whereby the number of films played is counted by said counter.

5. An electric circuit comprising a constant duty relay, a current source and a switch for controlling said constant duty relay, said switch being controlled by a make relay and a break relay, means for interlocking said make relay and said break relay, said constant duty relay controlling a plurality of switches, a number of said switches being normally open when said constant duty relay is not energized, the remainder of said switches being normally closed when said constant duty relay is not energized, said normally open switches being in line with a current source and a film projector for projecting a motion picture film, an exciter lamp and a loud-speaker, said normally closed switches controlling a slide projector connected with a current source, and a switch having three positions, one position for energizing said make relay, a second position for energizing said break relay, and a third position for selectively energizing said make relay and said break relay including means for controlling the energizing of said make relay and of said break relay within predetermined periods, and a normally closed film break switch in line with said constant duty relay, said film break switch being arranged to be opened upon breakage of the film projected by said film projector, whereby said constant duty relay cannot be energized and said slide projector operates continuously.

6. A housing having a screen, a mechanism in said housing including a film projector for projecting motion picture film onto said screen, an apparatus in said housing including a slide projector for projecting slide pictures onto said screen, and an electric circuit in said housing comprising a constant duty relay, a current source and a switch for controlling said constant duty relay, said switch being controlled by a make relay and a break relay having means for interlocking said two relays, said constant duty relay controlling a plurality of switches, a number of said switches being normally open when said constant duty relay is not energized, the remainder of said switches being normally closed when said constant duty relay is not energized, said normally open switches being in line with a current source and said film projector, said normally closed switches being in circuit with said slide projector and with a current source, a switch having three positions, one position for energizing said make relay, a second position for energizing said break relay, and a third position for selectively energizing said make relay and said break relay, a film switch and a slide switch in line with said three-way switch in its third position, said film switch being arranged to be closed when a predetermined portion of the film has been played for energizing said break relay, said slide switch being arranged to be closed when a predetermined number of the slide pictures has been shown for energizing said make relay, said film switch and said slide switch being effective in the third position of said three-way switch for controlling said make relay and said break relay.

7. A housing having a screen, a mechanism in said housing including a film projector for projecting motion picture film onto said screen, an exciter lamp and a loudspeaker forming part of said mechanism, an apparatus in said housing including a slide projector for projecting slide pictures onto said screen, and an electric circuit in said housing comprising a constant duty relay, a current source and a switch for controlling said constant duty relay, said switch being controlled by a make relay and a break relay, means for interlocking said make relay and said break relay, said constant duty relay controlling a plurality of switches, a number of said switches being normally open when said constant duty relay is not energized, the remainder of said switches being normally closed when said constant duty relay is not energized, said normally open switches being in line with a current source and said film projector, said exciter lamp and said loudspeaker, said normally closed switches being in circuit with said slide projector and with a current source, and a switch having three positions, one position for energizing said make relay, a second position for energizing said break relay, and a third position for selectively energizing said make relay and said break relay including a device for controlling the energizing of said make relay and of said break relay within predetermined periods in dependence upon the operation of said film projector and of said slide projector, and a normally closed film break switch being arranged to be opened upon breakage of the film projected by said film projector, whereby said constant duty relay cannot be energized and said slide projector operates continuously.

YERMIE STERN.